United States Patent [19]
Talbert

[11] 3,873,918
[45] Mar. 25, 1975

[54] PARTICLE ANALYZING APPARATUS INCLUDING A SYSTEM FOR VISUALLY DISPLAYING A PARTICLE SIZE DISTRIBUTION CURVE ON A 100 PERCENT SCALE IRRESPECTIVE OF THE QUANTITY OF PARTICLES SAMPLED BY THE APPARATUS

[75] Inventor: Robert L. Talbert, Hialeah, Fla.
[73] Assignee: Coulter Electronics, Inc., Hialeah, Fla.
[22] Filed: Jan. 21, 1974
[21] Appl. No.: 434,895

Related U.S. Application Data
[63] Continuation-in-part of Ser. No. 195,722, Nov. 4, 1971, abandoned.

[52] U.S. Cl. .............................. 324/71 CP, 324/115
[51] Int. Cl. ...................... G01n 27/00, G01r 15/08
[58] Field of Search ............ 324/71 CP, 115, 123 R; 307/237; 235/92 PC

[56] References Cited
UNITED STATES PATENTS
3,204,144  8/1965  Deavenport ........................ 324/115

Primary Examiner—Alfred E. Smith
Assistant Examiner—Ernest F. Karlsen
Attorney, Agent, or Firm—Silverman & Cass, Ltd.

[57] ABSTRACT
The system includes a gain control apparatus for automatically adjusting the amplitude of a plurality of signal levels by adjusting the maximum amplitude of the integral of the plurality of signal levels to equal the voltage level at the 100 percent mark on the vertical scale on the screen of an oscilloscope and for automatically readjusting this amplitude as the amplitude of each one of the plurality of signal levels increases. The plurality of signal levels appear on the output channels from a plurality of accumulators in the particle analyzing apparatus. Each accumulator accumulates pulses generated by particles within a given particle size range in a given amount of sample and the output signal level is indicative of the quantity of particles which fall within that size range and which have been sensed up to that point in time from the given amount of sample. The particle analyzing apparatus includes an electronic timer for sequentially and cyclically connecting the output channels to the oscilloscope for presenting a visual display of a particle size distribution curve. By automatically adjusting the maximum amplitude of the integral of the signal levels at different points in time as the particles are being analyzed, an operator utilizing the apparatus can immediately view a full scale particle size distribution curve after only a small portion of the given amount of sample has been analyzed. This is particularly useful where the analysis will take some time and the sample is substantially a homogeneous mixture whereby the particle size distribution curve for a small portion of the given amount of sample will be essentially the same as the curve for the given amount of sample.

23 Claims, 7 Drawing Figures

PATENTED MAR 25 1975 3,873,918

PARTICLE ANALYZING APPARATUS INCLUDING A SYSTEM FOR VISUALLY DISPLAYING A PARTICLE SIZE DISTRIBUTION CURVE ON A 100 PERCENT SCALE IRRESPECTIVE OF THE QUANTITY OF PARTICLES SAMPLED BY THE APPARATUS

CROSS REFERENCE TO RELATED APPLICATION

This application is a continuation-in-part of my co-pending application Ser. no. 195,722 filed on Nov. 4, 1971, now abandoned.

BACKGROUND OF THE INVENTION

The present invention relates to a system for automatically displaying a data distribution curve on a 100% scale irrespective of the quantity of data sampled. More specifically, the invention relates to a system for automatically adjusting the amplification of a visual display of a particle size distribution curve for particle sizes in a sample of particles being analyzed.

In the field of particle analysis, it is often important to determine the size distribution of particles in a given amount of sample of particulate matter or of particles suspended in a fluid. To obtain an indication of the size distribution of particles in the given amount of sample, the given amount of sample is passed through a particle size analyzing device (such as a Coulter type particle analyzing device). The particle analyzing device produces signals in the form of pulses with the amplitude of each pulse being related to the size of the particle sensed. To determine how many particles are in a given size range, the pulses are applied to a plurality of so-called "window comparators" each of which is adapted to sense pulses between predetermined lower and upper threshold levels which are directly related to a particular particle size range. Upon sensing a particle having its maximum amplitude falling within the predetermined threshold levels, a window comparator will produce an output pulse having a predetermined amplitude. The output pulses from the window comparators are applied to individual accumulators. The output signal level of each accumulator changes-increases-with time as pulses are accumulated and is indicative of the number of particles sensed within a given particle size range. The accumulators are sequentially connected in a predetermined order to a display device - an oscilloscope - to provide a visual display of a particle size distribution curve on cartesian coordinates where the horizontal or x axis represents particle size and the vertical or y axis represents the accumulated quantity of particles. Typically an electronic timer is provided for cyclically connecting all the accumulators to the visual display device in the preselected order such that successive curves are traced or displayed on the visual display device. As more and more particles are sensed, the maximum amplitude of each curve traced increases until the given amount of sample has been passed through the particle analyzing device, at which time the curve being traced is the particle size distribution curve for the given amount of sample.

A period of time will elapse as the trace of the particle size distribution curve "grows" - increases in amplitude-while maintaining the same general shape. Since, in most instances, the sample comprises a homogeneous mixture of particles of various size, the size distribution curve for differential quantities of the sample will be essentially the same. Accordingly, as soon as an amount of sample sufficient to produce a representative size distribution curve has been sensed, it is desirable to view the curve on the full scale of the visual display device for various purposes, for example, to immediately determine whether or not the analysis of the sample is as expected or is being properly made.

With presently available particle analysis equipment, this is accomplished by manually adjusting a given control (gain control) knob and/or a range switch on the visual display device. Of course, as the quantity of sample sensed increases, the gain will have to be decreased. At present time is done manually and repeatedly during the time it takes to analyze the given amount of sample selected and accumulate the desired data. This time period can range from several seconds to four or five minutes, or even longer.

Also as soon as a curve representative of the sample distribution is obtained, it is desirable to integrate the sample distribution curve to obtain an integral curve typically in the form of an S on a slant and to analyze the integral curve to determine the percent concentration of particles in a given size range. To quickly accomplish this it is desirable to adjust the maximum amplitude of the integral curve to an amplitude equal to 100 percent on a scale on the screen of the visual display device. The other points at lower amplitude levels on the integral curve will then be equivalent to the percent of concentration of particles within a given size range. Heretofore such adjustments required a significant amount of time and depended in part upon the skill of the operator in order to obtain a relatively accurate visual display of the data accumulated to that point in time.

The ability to display a full scale representation of the data accumulated so far at any point in time and independent of the actual amount of data accumulated is especially valuable to industry and the medical profession. Specifically, it is useful in the monitoring of crystal growth, particulate composition, medical chemistry, and hematology profiles where such ability to display the relationship of one piece of data to another piece of data or to several pieces of data must be done quickly and accurately.

To obtain the desired display some apparatus must be provided for amplifying the developing data-particle distribution curve as soon as significant data is obtained and the integral thereof to full scale on the visual display device. Also such apparatus must be able to automatically adjust — lower the gain — as more and more particles are sensed whereby the size or maximum amplitude of the particle size distribution curve and the integral thereof will remain essentially constant although its general contour or shape may vary slightly as the data is accumulated.

It is to be understood, of course, that gain control apparatus per se have been known for some time and examples of same may be found in the following U.S. Pats.:

From the foregoing remarks it will be apparent that a principle object of the invention is to provide in a particle analyzing apparatus a system for automatically adjusting the amplitude of a particle size distribution curve for a small portion of the particles analyzed by the apparatus so as to display the same at full scale over a substantial portion of the viewing area on a visual display device regardless of the amount of particles analyzed up to that point in time.

It is also an object of the invention to provide in the particle analyzing apparatus, a system for automatically maintaining the maximum amplitude of the integral of the particle size distribution curve at 100 percent on the scale on the screen of the visual display device while maintaining proportional linearity of the particle size distribution curve displayed on the visual display device.

SUMMARY OF THE INVENTION

According to the invention there is provided a method for presenting a visual display of particle size distribution and the integral thereof including the steps of passing a given amount of sample containing a plurality of particles through a sensing zone, generating a particle pulse for each particle sensed, each particle pulse having an amplitude related to the size of the particle sensed, segregating the particle pulses into a predetermined number of pulses amplitude ranges, generating in each range an output pulse for each particle pulse having an amplitude falling in that range, separately accumulating the output pulses in each range to obtain a plurality of signal levels each being indicative of the number or quantity of particles in a given size range, cyclically applying the signal levels in a timed sequence to a visual display device to present thereon a particle size distribution curve, and cyclically, sequentially and in cumulative timed steps applying the signal levels to the visual display device to present thereon an integral curve of the particle size distribution curve, the last two steps being repeatedly performed while output pulses are being accumulated, and the steps of cyclically and automatically adjusting the maximum amplitude of the integral curve with respect to a reference voltage related to the maximum voltage to be displayed on the visual display device for a given setting thereof.

Also according to the invention there is provided a particle analyzing apparatus including circuitry for generating a signal for each particle sensed in a sensing zone, each signal being related to the size of the particle sensed, accumulators for accumulating signals for particles falling in different size ranges, a visual display device for displaying the signal levels in the various accumulators, and a system for adjusting the signal level received from each accumulator before the signal level is displayed on the visual display device, the system including circuitry for cyclically and automatically adjusting the amplitude of the sum of the signal levels with respect to a reference voltage related to the maximum voltage to be displayed on the visual display device for a given setting thereof whereby, for the sum of the signal levels, the system cyclically produces an output signal having a maximum amplitude substantially equal to the reference voltage during the processing of a fluid sample containing particles and for any aliquot thereof.

DESCRIPTION OF THE PREFERRED EMBODIMENTS

Figures 1, 2:
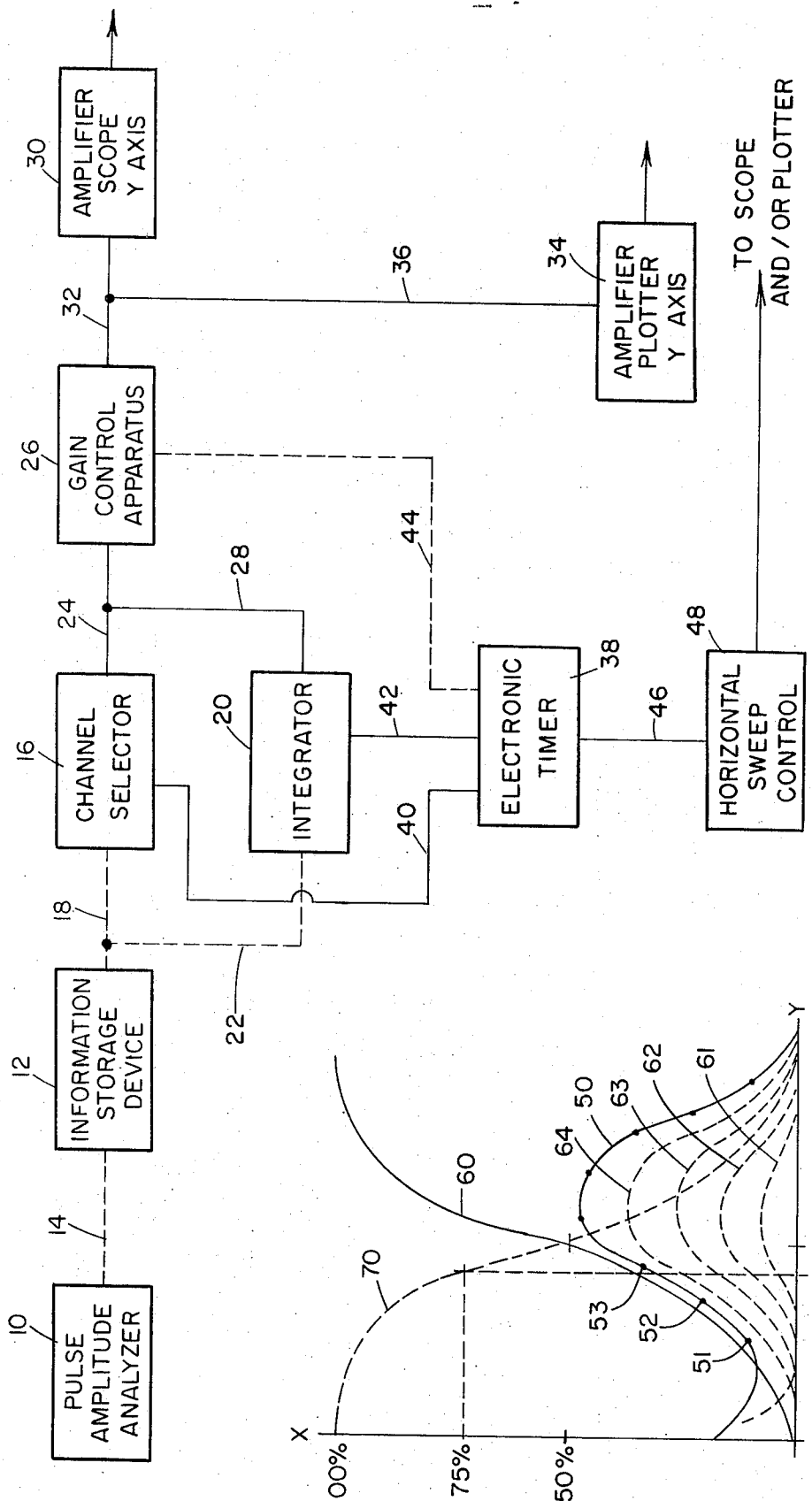
FIG. 1 is a schematic block diagram of a particle size analyzing device incorporating the gain control apparatus of the invention.
FIG. 2 is a graph of the particle size distribution curve and the integral curve thereof as viewed on an oscilloscope.

A schematic block diagram of a particle analyzing apparatus is shown in FIG. 1 and includes a pulse amplitude analyzer 10. The analyzer 10 includes a particle analyzing device such as a Coulter particle analyzing device wherein a given amount of sample containing a plurality of particles is passed through a sensing zone where each particle is sensed and generates a signal in the form of a particle pulse having an amplitude related to the size or volume of the particle. Each particle pulse is applied to a pulse amplitude discriminator circuit which includes a plurality of so-called "window comparators." Each of the window comparators is adapted to sense particle pulses having an amplitude falling between a predetermined lower threshold level and a predetermined upper threshold level. Upon sensing a particle pulse having an amplitude falling within the predetermined lower and upper threshold levels, each of the window comparators will produce an output pulse.

Each of the window comparators is connected by a separate individual channel to an accumulator or integrator in an information storage device 12. The plurality of channels connecting each window comparator with each accumulator are designated by a broken line 14.

Each of the accumulators in the storage device 12 is connected by a separate and individual channel to an individual electronic switch in a channel selector 16. The plurality of channels connecting each accumulator with each electronic switch is indicated by a broken line 18. Each one of the accumulators is also connected by a separate and individual channel to an individual electronic switch in an integrator 20. The plurality of channels connecting each accumulator with each electronic switch in the integrator 20 are indicated by a broken line 22. The output from the channel selector is connected by a lead 24 to the gain control apparatus of the invention shown at 26. The output from the integrator 20 is also connected to the gain control apparatus 26 via a lead 28. The output from the gain control apparatus can be applied to either an amplifier 30 for the y axis of an oscilloscope (not shown) via a lead 32 and/or can be applied to an amplifier 34 for the y axis of a plotter (not shown) via a lead 36.

As shown, an electronic timer 38 is connected to the channel selector 16, the integrator 20 and the gain control apparatus 26 via leads 40, 42 and 44 respectively. The electronic timer 38 is also connected via a lead 46 to a horizontal sweep control 48 for the scope and/or the plotter (not shown).

The electronic timer controls the closing of the electronic switches in the channel selector 16 and the electronic switches in the integrator 20 so that when the electronic timer is operating the switches in the channel selector 16, each of the channels 18 is sequentially connected to the output lead 24 in a predetermined order, each channel being connected for a predetermined time to the output lead 24. In this way, the electronic timer can selectively apply signals to the y axis amplifier 30 of the oscilloscope. At the same time the electronic timer 38, by controlling the horizontal display control 48, will operate the horizontal sweep for the oscilloscope in timed relationship to the operation of the channel selector 16. For example, for a first period of time corresponding to a portion of the period of the horizontal sweep, the electronic timer 38 will connect a first channel from the information storage device 12 to the output lead 24. For a particle size analyzing device, this first channel will have an output signal level thereon indicative of the number of particles sensed which have a size falling within a first particle size range such as zero to one x microns. Then for a second period of time equal to the first period of time, the timer will connect a second channel having an output signal level from an accumulator in the information storage device to the output lead 24. This second output signal level will be indicative of particles having a size falling within a second range such as one $x$ microns to two $x$ microns. The electronic timer 38 will continue to connect various ones of the channels 18 to the output lead sequentially in a predetermined order, each for a predetermined time period.

Ignoring for the moment, the gain control apparatus 26, each of the output signal levels applied to the amplifier 30 for the y axis of the oscilloscope will appear as a dot on the scope and the plurality of dots generated by the timed application of the output signal levels to the amplifier 30 will trace a curve on the scope which is referred to as a differential curve or a particle size distribution curve. Such a particle size distribution curve or differential curve is shown at 50 in FIG. 2 and is traced by the plurality of dots three of which are indicated at 51, 52 and 53.

An integral curve of the particle size distribution curve 50 is obtained by selectively adding the output signal levels on the channels 22 in a predetermined order and at predetermined time intervals. This is accomplished by the electronic timer 38 which will first operate or close a first switch in the integrator 20 connecting the first channel from the first accumulator in the information storage device 12 to the output lead 28 and will maintain the switch closed for the complete time period of the horizontal sweep. After a predetermined time period, the electronic timer will close a second switch in the integrator 20 for connectingg a second channel from the device 12 to the lead 28 and will maintain that switch closed for the duration of the period of the horizontal sweep. Subsequently, the electronic timer will close and maintain closed the other switches in the integrator 20 to sequentially connect the other channels of the channel 22 to the output lead 28. In this way, an integral curve is traced on the screen of the oscilloscope and such an integral curve is shown at 60 in FIG. 2.

It is to be understood that the electronic timer cyclically and sequentially operates the electronic switches in the channel selector 16 and the electronic switches in the channel selector 20. Also, and as will be explained in detail hereinafter in connection with the description of FIGS. 3 and 4, the electronic timer cyclically alters the circuit connections in the gain control apparatus for operating the gain control apparatus in one of several modes of operation thereof. Thus, as data, such as particle pulses, are being analyzed by the pulse amplitude analyzer 10 and output pulses are being accumulated in the storage device 12 so as to develop increasing output signal levels on the channels 18 and 22, the electronic timer is cylically operating the channel selector 16, the integrator 20 and the gain control apparatus 26 in timed relation with the horizontal sweep of the oscilloscope or plotter.

As a result, while data is being analyzed and stored, the quantity of data accumulated at several points in time during the analysis of all the data is displayed on the oscilloscope. Thus, as particles are being sensed, and output pulses are being accumulated in the accumulators, the timer 38 is cyclically and sequentially closing the switches in the channel selector 16 such that the developing particle size distribution curve for a given amount of sample is continually and automatically being traced on the oscilloscope as indicated by the curves 61–64 shown in broken lines in FIG. 2. After the given amount of sample has been passed through the particle analyzing device, the output signal level on each one of the channels 18 from the accumulators in the device 12 will have reached a steady state so that successive traces of the particle size distribution curve on the oscilloscope will be the curve 50. At that time the integral curve for the particle size distribution curve 50 will be the curve 60 shown in FIG. 2.

A period of time will elapse as the trace of the particle size distribution curve "growth" - increases in amplitude - while maintaining the same general shape. Since, in most instances, the data being analyzed such as a given amount of sample containing particles, comprising a homogeneous mixture of data, the size distribution for different quantities or portions of the total data - given amount of sample - will be essentially the same. Thus, as soon as a significant amount of data has been analyzed to produce a sample distribution curve representative of the sample distribution curve for the total quantity of data being analyzed, such as the curve 61, it is desirable to immediately amplify the curve 61 to the magnitude of the curve 50 and more importantly to amplify the integral of the curve 61 to the amplitude of the curve 60. In accordance with the teachings of the invention, the gain control apparatus is cyclically operated to cyclically and automatically adjust the gain of an amplifier therein for amplifying each of the developing curves such as the curve 61–64 to the magnitude of the curve 50. As will now be explained in connection with the description of FIGS. 3 and 4 this is accomplished by amplifying the maximum amplitude of the integral curve of each one of the intermediate traces of the sample distribution curve, such as the curve 61, to an amplitude equal to 100 percent on a scale on the screen of the oscilloscope. That is to say to a maximum amplitude equal to the maximum amplitude of the curve 60. Typically, the operation of the integrator by the electronic timer 38 is reversed so as to produce a mirror image of the curve 60 as shown in phantom lines at 70 in FIG. 2. This mirror image or reverse integral curve 70 is preferred since an operator can pick out any percentage point, such as 75 percent, and read across to the curve 70 and then read down to the size on the y scale and know that 75 percent of the particles have a size greater than A.

Figure 3:
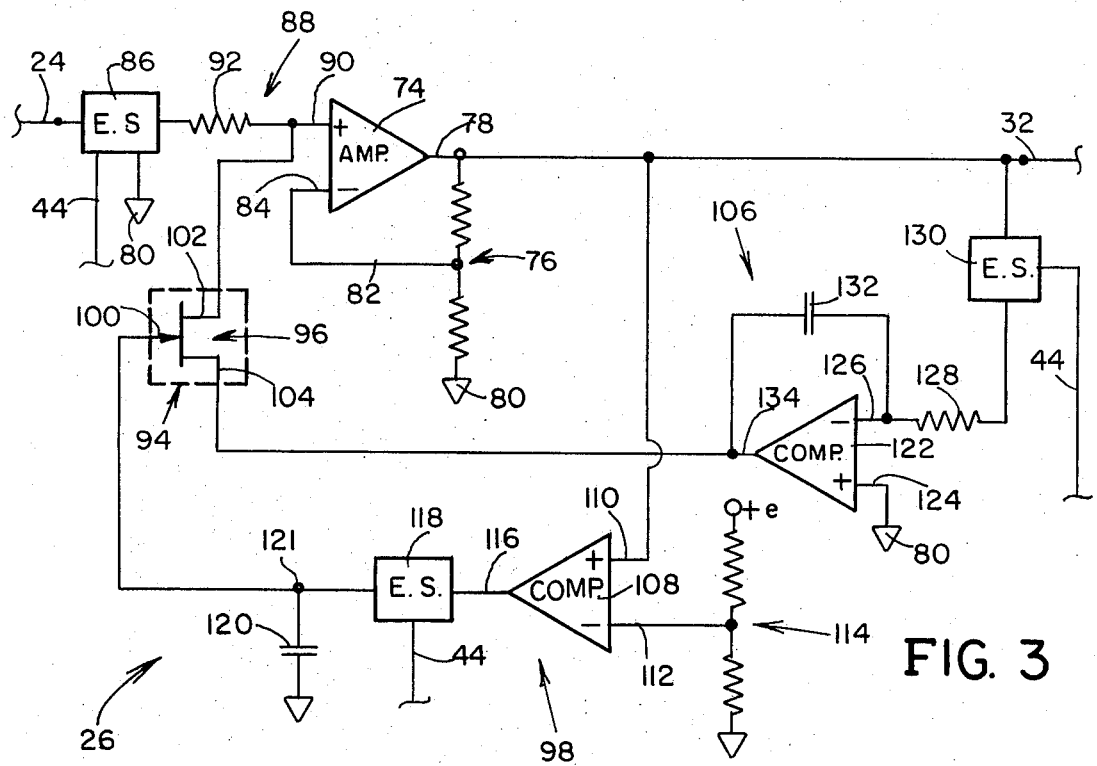
FIG. 3 is a schematic circuit diagram of one embodiment of the gain control apparatus of the invention in which the gain control is obtained by attenuating the input signal to an amplifier.

One preferred embodiment of the gain control apparatus 26 of the invention is shown in FIG. 3 and includes an amplifier 74 having a gain control circuit 76. The gain control circuit 76 includes two resistors connected between the output 78 of the amplifier 74 and a common conductor 80 connected to the commoner ground potential for the apparatus 26. A feedback lead 82 is connected between the junction between the two resistors and one input 84 of the amplifiers 74. Signals appearing on the lead 24 are applied at predetermined times through an electronic switch 86 and an attenuation circuit 88 to another input 90 of the amplifier 74.

The attenuation circuit 88 includes a resistor 92 connected between the switch 86 and the input 90 and a variable voltage resistance 94 which in the illustrated embodiment is a field-effect transistor 96. The apparatus 16 includes a feedback circuit 98 connected between the output 78 of the amplifier 74 and the gate 100 of the field-effect transistor 96. The drain terminal 102 of the transistor 96 is connected to the input 90 and the source terminal 104 of the transistor 96 is connected to a zero offset circuit 106.

The feedback circuit 98 includes a comparator 108 having one input 110 connected to the output 78 of the amplifier 74 and another input 112 connected to a source 114 of reference voltage. The output 116 of the comparator 108 is selectively connected through a switch 118 to a capacitor 120 and the gate 100 of the transistor 96. The capacitor 120 serves as a memory device for memorizing a correction signal appearing at the output 116 of the comparator 108. The correction signal is maintained at the junction 121.

The zero offset circuit 106 includes a comparator 122 which has one input 124 thereof connected to the common conductor 80 and another input 126 which is adapted to be connected through a current limiting resistor 128 and an electronic switch 130 to the output 78 of the amplifier 74. The comparator 122 is connected as an operational amplifier with a capacitor 132 connected between the input 126 and the output 134 of the comparator 122. The output 134 is also connected to the source terminal 104 of the transistor 96.

A preferred operation of the gain control apparatus 26 will now be described with reference to FIGS. 1, 3 and 4. As previously stated, the electronic timer 38 controls the operation of the gain control apparatus 26. In this respect the timer 38 is adapted to operate the switches 86, 118 and 130 in a predetermined manner to operate the gain control apparatus 26 in four modes. These four modes are indicated graphically by roman numerals I–IV on FIG. 4. Each mode takes place during a time period equal to one horizontal sweep of the oscilloscope.

Figure 4:
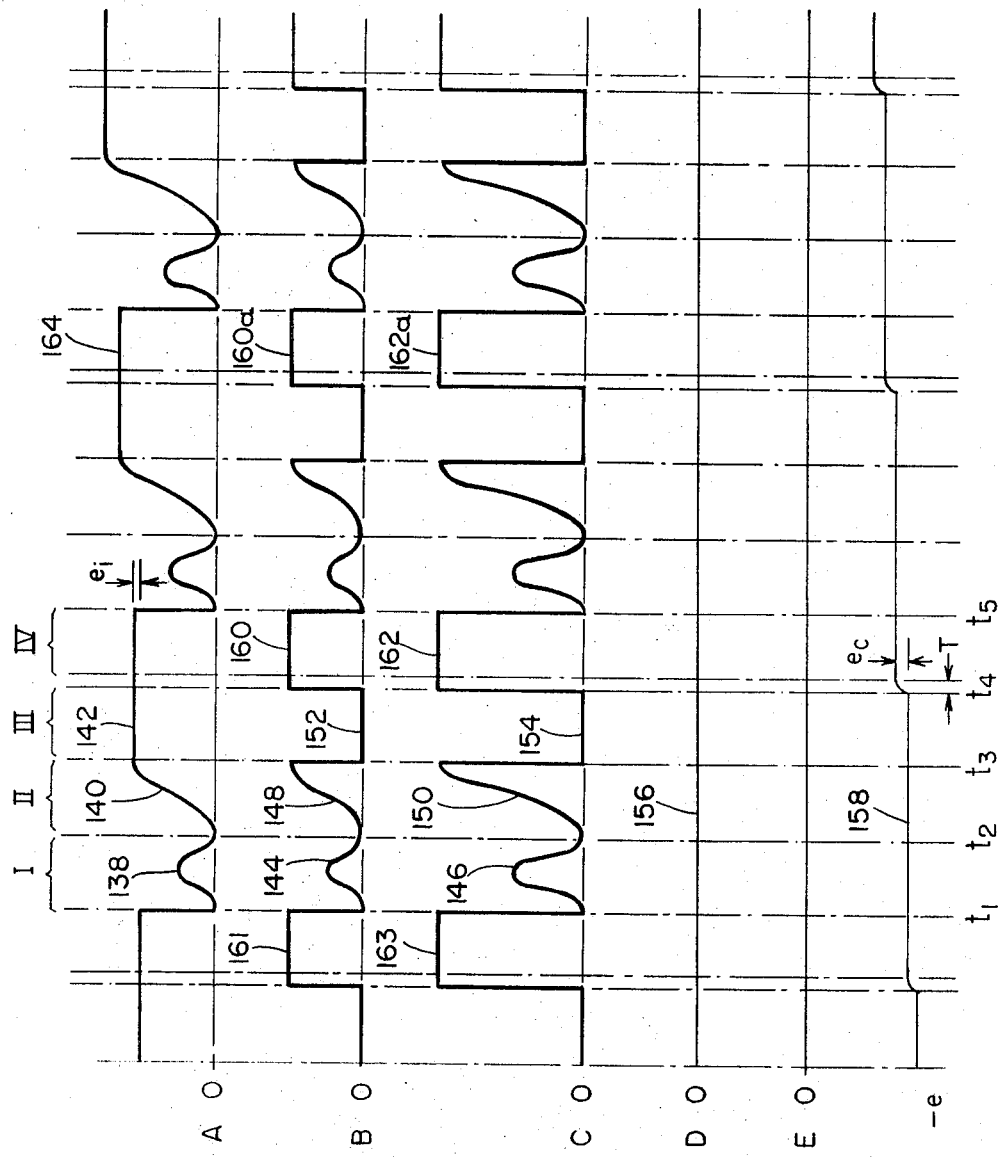
FIG. 4 is a series of graphs on the same time scale showing the waveforms at various points in the circuit of the gain control apparatus of the invention shown in FIG. 3 during several modes of operation thereof.

In FIG. 4, the graph A represents the signals passed by either the channel selector 16 or the integrator 20 to the gain control apparatus 26. Thus, in the first mode, a differential curve 138 is applied to the gain control apparatus 26. In the second mode, an integral curve 140 of the curve 138 is applied to the apparatus 26. In the third and fourth modes, the electronic timer 38 latches the electronic switches in the integrator 20 to a closed position such that the maximum amplitude of the integral curve is applied to the apparatus 26 as indicated at 142 in graph A of FIG. 4. Graph B of FIG. 4 represents the signal being applied to the input 90 of the amplifier 74 during the four modes of operation of the apparatus 26. Graph C represents the signal appearing at the output 78 of the amplifier 74 during the same period of time. Graph D represents the voltage across or stored in the capacitor 132 of the zero offset or zero correct circuit 106. Graph E represents the voltage appearing at the junction 121 of the capacitor 120 and the gate 100. It will be noted that Graph E is a negative voltage which increases towards zero to increase the attenuation of the voltage variable resistor 94 - the field-effect transistor 96.

From Graphs A, B and C of FIG. 4, it will be noted that during the first mode of operation of the apparatus 26, signals representing the differential or data distribution curve are passed through the apparatus 26 to the oscilloscope. In this respect the input differential signal is shown at 144 in Graph B and the output differential signal is shown at 146 in Graph C. In the second mode of operation of the apparatus 26, the signal representing the integral of the differential signal 138 is passed through the apparatus 26 to the oscilloscope.

The input integral signal is shown at 148 in Graph B and the output integral signal is shown at 150 in Graph C. During the first two modes of operation of the apparatus 26, the timer 38 is applying signals via the lead 44 to the switches 86, 118 and 130 to maintain the switch 86 in a position where it connects the lead 24 to the resistor 92 and to maintain the switches 118 and 130 in an open condition. Then at the beginning of the third mode of operation of the apparatus 26, the switch 86 is operated to connect the resistor 92 to ground. At the same time the switch 130 is operated to connect the output 74 to the input 126 of the comparator 122 through the resistor 128. This third mode of operation can be referred to as a zero correct mode. In this mode of opeation, a zero input signal is applied from the common conductor 80 through the resistor 92 to the input 90 and the output signal appearing at the output 78 is compared by the comparator 122 with the common potential on the common conductor 80 connected to the input 124 of the comparator 122. Stated otherwise, with ground potential on the input 90 of the amplifier 74, a near ground potential state will be established at the output 78. The signal at the output 78 may not be an absolute ground potential due to slight voltage offsets within the amplifier 74. For example, it may be due to drift of voltage settings in the amplifier 74. When the output 78 is not at ground potential, the comparator 122 functions as integrator with the resistor 128 acting as a current limiting device and the capacitor 132 acting as a storage or memory device. The capacitor 132 will then charge toward the voltage value present at the output 74 and there so remain until the third mode of operation is again repeated. The voltage across the capacitor 132 will also be present at the source terminal 104 and defines the voltage level above which all information will be processed. In other words, the voltage on capacitor 132 sets the zero level. The zero level input signal to the input 90 of the amplifier 74 is shown at 152 in Graph B. The zero output level at the output 78 is shown at 154 in Graph C. The zero correct or zero offset signal is shown at 156 in Graph D. This is the signal appearing at the output 134 of the comparator 122.

In the fourth mode of operation of the gain control apparatus 26, the timer 38 operates the switch 86 to connect the lead 24 to the resistor 92, operates the switch 132 to place the same in an open state, and closes the switch 118 to connect the output 116 from the comparator 108 to the capacitor 120 and the gate 100. At the same time and as described above, the maximum amplitude of the input signal, namely, the maximum amplitude of the integral 140 is being applied as indicated at 142 in Graph A to the gain control apparatus 26 via the lead 24. As soon as the switch 118 is closed the voltage at the output 78 of the amplifier 74 is compared with the reference voltage from the reference source 114 and a difference or correct signal is produced at the output 116 of the comparator 108 and passed by the switch 118 to the capacitor 120. As shown in Graph E of FIG. 4, the initial difference signal is a negative voltage having some negative value. As the maximum input signal to the apparatus 26 increases, the difference signal will be such as to cause the capacitor 120 to discharge. The voltage level on the capacitor 120 is shown at 158 in Graph E. It will be noted that at the beginning of each fourth period the voltage 158 increases to a less negative value during a time period T. The voltage level 158 appears at the junction 121 of the capacitor with the gate 100 and switch 118. The change in the signal 158 from one negative value to a less negative value causes the voltage variable resistor 94 to attenuate the input to the amplifier 74 by an amount proportionate to the increase of the maximum amplitude signal appearing on the lead 24. This voltage increase is shown at $e_i$ in Graph A of FIG. 4 and the correction voltage or correction signal is shown at $e_c$ in Graph E of FIG. 4.

As a result of this correction, the maximum amplitude of the integral curve 148 in Graph B, as held in the fourth mode and indicated at 160, will be maintained at the same amplitude as the previous maximum amplitude indicated at 161 in Graph B. Likewise, the maximum amplitude of the integral curve 150 appearing at the output 78 of the amplifier 74 will be maintained at a maximum level indicated at 162 in Graph C which is the same maximum amplitude of the integral curve prior to the cycle of the four modes of operation as indicated at 163 in Graph C of FIG. 4. This maximum amplitude of the output signal appearing at the output 78 of the amplifier 74 is also equal to the reference voltage applied to the comparator 108. As described above, this reference voltage is equal to the maximum voltage on a scale on the screen of the oscilloscope so that the differential curve and the integral curve of the accumulated data will be maintained substantially constant while additional data is being accumulated during succeeding cycles of the timer 38 which cycles the operation of the gain control apparatus 26 through the four modes of operation thereof. Thus, during a succeeding fourth mode of operation of the apparatus 26, the maximum input signal appearing on the lead 24 will have increased a small amount as shown by the amplitude level 164 in Graph A of FIG. 4. However, the feedback circuit 98 will produce a command signal in the voltage level 158 appearing at the junction 121 to change the attenuation by the attenuation circuit 88 such that the maximum input signal to the input 90 of the amplifier 74 which is shown at 160a in Graph B will be of the same magnitude as the maximum signal 160 during the previous fourth mode of operation of the apparatus 26. Likewise, the maximum amplitude of the output signal appearing at the output 78 will be maintained at the same level as shown at 162a, 162 and 163 in Graph C. This voltage level is of course equal to the reference voltage. As a result as soon as a significant amount of data has been analyzed so as to produce a representative differential curve 61, the gain control apparatus 26 of the present invention will automatically amplify that differential curve to the size of the curve 50 and for every fourth sweep of the horizontal sweep of the oscilloscope, the gain control apparatus 26 will automatically readjust the amplification of the maximum amplitude of the input signal applied to the gain control apparatus 26 such that the maximum output of the amplifier 74 applied to the scope will be constant. Again, this maximum amplitude applied to the scope will be the maximum amplitude of the integral curve of the differential curve and will be equal to the voltage level corresponding to the 100 percent scale on the screen of the scope.

Figure 5:
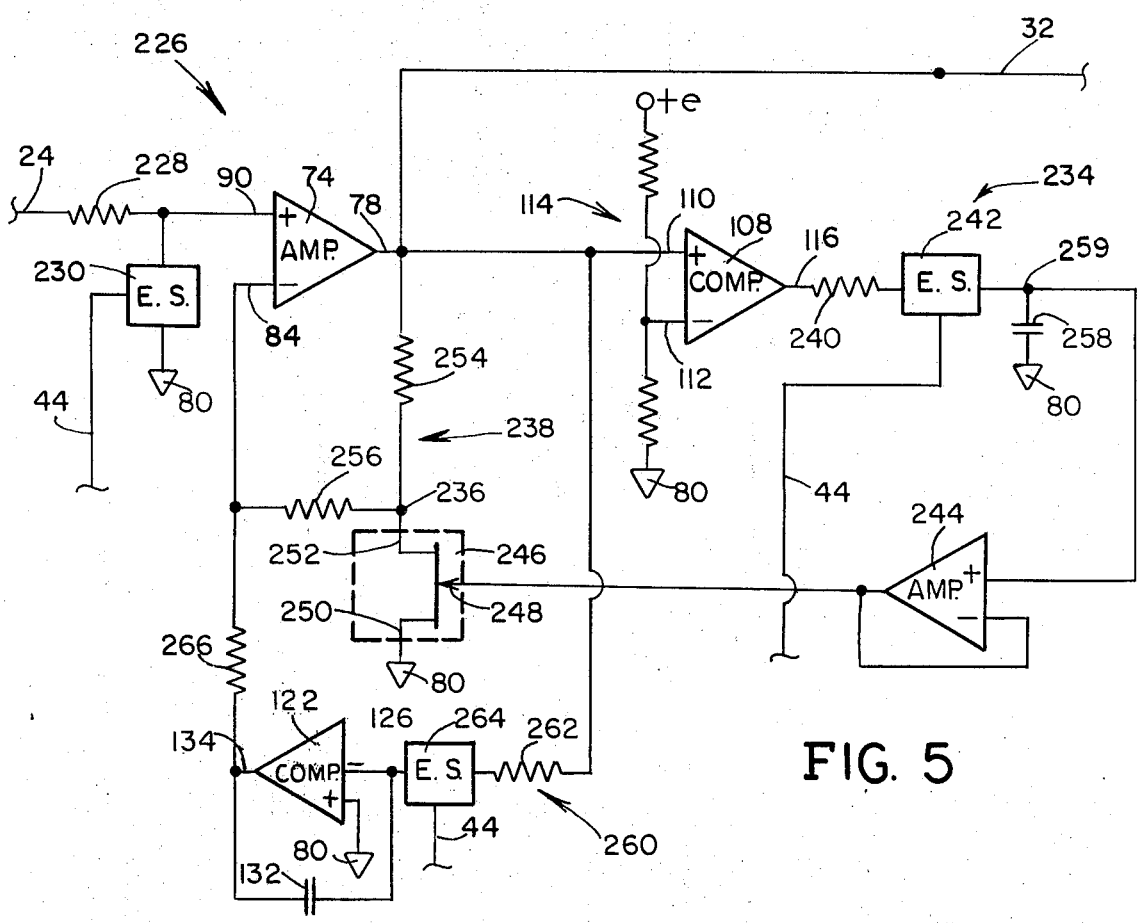
FIG. 5 is a schematic circuit diagram of another embodiment of the gain control apparatus of the invention where gain control is obtained by changing the impedance in the gain control circuit of an amplifier.

A schematic circuit diagram of another embodiment of the gain control apparatus of the invention is shown at 226 in FIG. 5. Where identical elements are utilized in the apparatus 226 as are used in the apparatus 26 identical reference numerals are used. Thus, the apparatus 26 includes the amplifier 74, the comparator 108 and the comparator 122. As shown, the lead 24 is connected through a resistor 228 to the input 90 of the amplifier 74. Also an electronic switch 230 is connected between the common conductor 80 and the input 90 of the amplifier 74. The switch 230 is closed by the timer 38 during the third or zero reset mode of operation of the apparatus 226 so as to connect the input 90 to ground potential.

In the gain control apparatus 226, the output signal appearing at the output 78 is applied via a feedback circuit 234 to a junction or point 236 in a gain control circuit 238 of the amplifier 74. The feedback circuit 234 includes the comparator 108 with the output 116 of the comparator 108 connected through a resistor 240, an electronic switch 242 and a buffer amplifier 244 to a voltage variable resistor 246 which is connected between the junction 236 of the common conductor 80. The voltage variable resistor 246 is similar to the voltage variable resistor 94. In this respect the resistor 246 is preferably a field-effect transistor having a gate 248 connected to the output of the buffer amplifier 244, a source terminal 250 connected to the common conductor 80 and a drain terminal 252 connected to the junction 236. The gain control circuit 238 for the amplifier 74 is defined by a resistor 254 and the voltage variable resistor 236 which are connected in series between the output 78 and the common conductor 80. The junction 236 between the two resistors 254 and 246 is coupled through a coupling resistor 256 to the negative input 84 of the amplifier 74. In the operation of the feedback circuit 234, the ratio of the resistor 246 to the resistor 254 can vary from 1:1 to 1:10. It will be understood of course that any change in the resistance of the resistor 246 will alter the gain of the amplifier 74 since the potential at 236 which is fed back to the negative input 84 will be changed for each change in resistance of the resistor 246. Thus, whenever the switch 242 is closed in a fourth mode of operation of the apparatus 226, the maximum amplitude of the integral of the signal level representing the accumulated information as amplified by the amplifier 74 will be compared by the comparator 108 with the reference voltage from the reference voltage source 114. If there is a difference between these two voltages, a difference signal appearing at the output 116 of the comparator 108 is passed by the switch 242 to the gate 248 to alter the resistance of the voltage variable resistor 246 to thereby alter the gain of the amplifier 74 until the output voltage of the output 78 equals the reference voltage. The difference or command signal is also stored in a memory device or capacitor 258, which functions in the same manner as the capacitor 120, for maintaining the difference or command signal at the junction 259 which is applied through the buffer amplifier 244 to the variable resistor 246.

The apparatus 226 also includes a zero correct or zero adjust circuit 260 which includes the comparator 122 and the capacitor 132. The zero adjust circuit 260 also includes a resistor 262 and an electronic switch 264 which are connected in series between the output 78 of the amplifier 74 and the input 126 of the comparator 122. The resistor 262 is a current limiting resistor similar to the resistor 128 and the electronic switch 264 operates in the same manner as the switch 130 shown in FIG. 3. In this respect, the switch 264 is closed during the third mode of operation of the gain control apparatus 226 for the purpose of effecting a zero correct operation in a similar manner as the circuit 106 is operated in FIG. 3 as described above.

It will be understood that the switches 242 and 264 are operated by the timer 38 in the same manner that the switches 118 and 130 are operated in the apparatus 26 shown in FIG. 3 whereby the apparatus 226 has four modes of operation identical to the four modes of operation of the apparatus 26. As a result the signals shown in Graphs B and C of FIG. 4 also represent the signals which will appear at the input 90 and output 78 of the amplifier 74 used in the circuit 226. Also it will be understood that the zero adjust signal appearing at the output 134 of the comparator 122 is applied in the zero set mode through a resistor 266 to the negative input 84 of the amplifier 74. Additionally it will be understood that the resistors 256 and 266 are high resistance coupling resistors and have a resistance value substantially greater than the resistance value of the resistors 254 and 246 of the gain control circuit 238.

Figure 6:
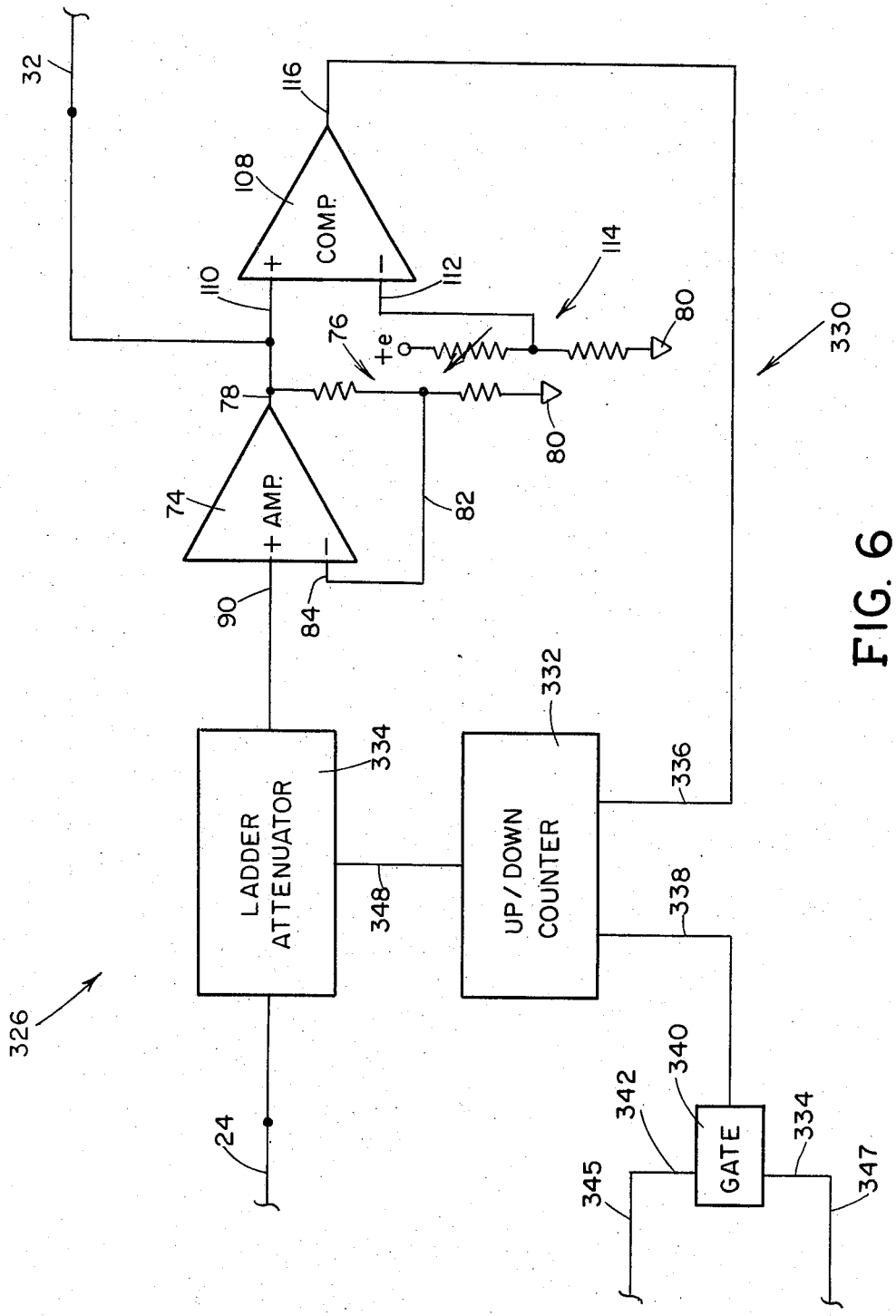
FIG. 6 is a schematic circuit diagram of still another embodiment of the gain control apparatus of the invention where gain control is obtained by digitally attenuating the input signal to an amplifier.

A schematic circuit diagram of still another embodiment of the gain control apparatus of the invention is shown at 326 in FIG. 6. Again, where similar or identical circuit elements are used in the apparatus 326 as are used in the apparatus 26 identical reference numerals are used. In this respect, the apparatus 326 includes the amplifier 74 and the gain control circuit 76 therefor. The apparatus 326 also includes the reference voltage source 114 and the comparator 108 which forms part of a feedback circuit 330. The apparatus 326 functions somewhat differently from the apparatus 26 or 226. In this respect, the apparatus 326 can be considered a digital gain control apparatus which provides incremental or step (digital) changes in the amplitude of the maximum input signal applied to the amplifier 74. Also, the apparatus 326 is operated by a different control circuit which does not include the timer 38. Additionally, the apparatus 326 does not include a zero correct or zero reset circuit.

As shown the feedback circuit 330 includes an up/down counter 332 and a ladder attenuator 334. The difference or correct signal appearing at the output 116 of the comparator 108 is fed to one input 336 of the up/down counter 332. Another input 338 of the up/down counter 332 receives code signals from a gate 340. The gate 340 has a clock input 342 and a strobe input 344 which receives respectfully clock signals and strobe signals from a control device (not shown) via leads 345 and 347. The output from the up/down counter 332 is applied via a lead 348 to a plurality of electronic switches (not shown) in the ladder attenuator 334. As shown the ladder attenuator 334 is connected between the lead 24 and the input 90 of the amplifier 74. The ladder attenuator 334 includes a matrix of resistors which are connected in various combinations by the electronic switches within the attenuator 334 so as to attenuate the signal on the lead 24 before it is applied to the input 90. One commercially available attenuator which can be utilized in the circuit 330 for the attenuator 334 is found in the Motorola integrated circuit No. MC1508L.

Figure 7:
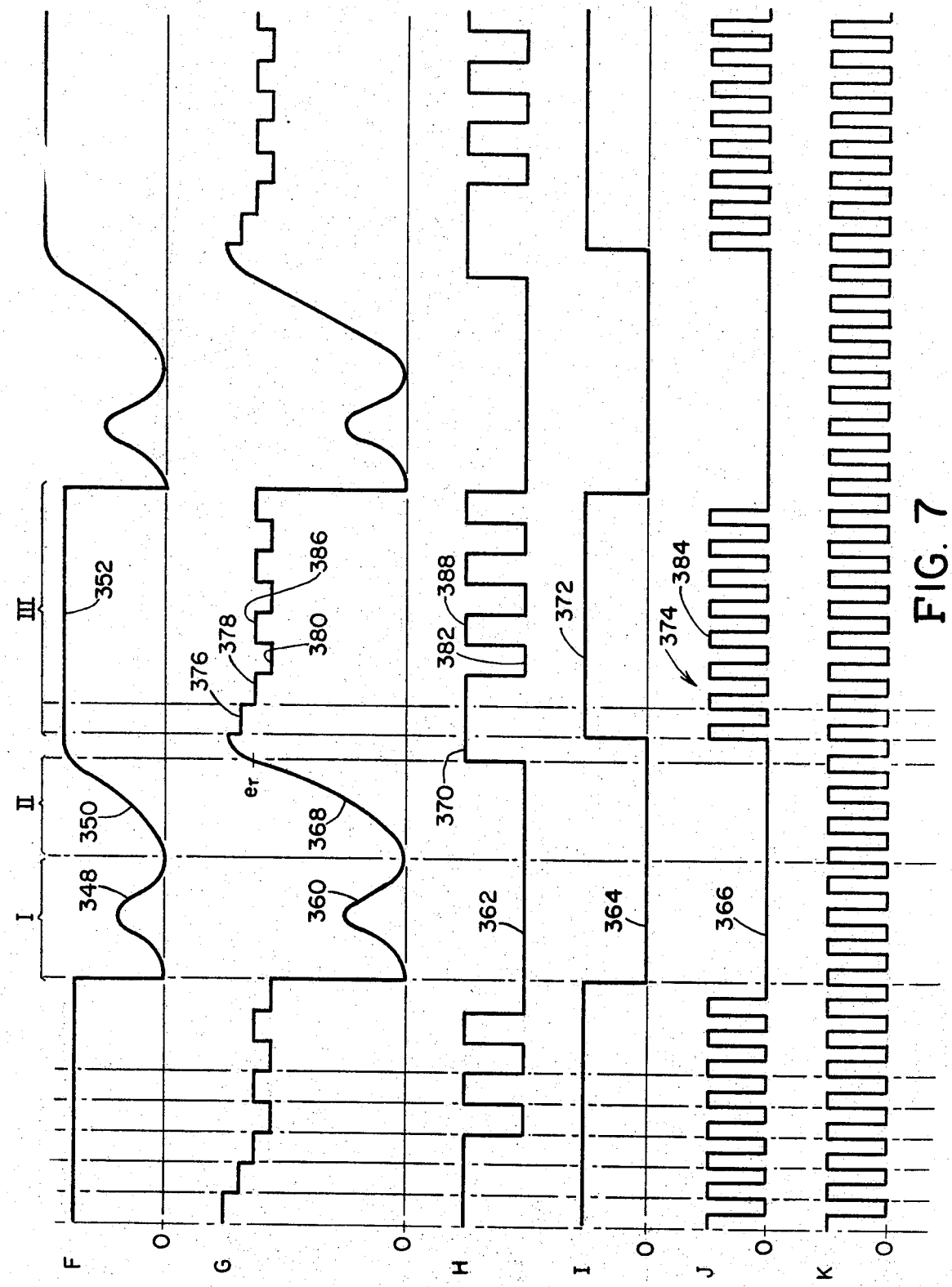
FIG. 7 is a series of graphs on the same time scale showing the waveforms at various points in the circuit of the gain control apparatus of the invention shown in FIG. 6 during several modes of operation thereof.

The operation of the gain control apparatus 326 will now be described with reference to FIGS. 6 and 7. The Graph F in FIG. 7 is substantially the same as the Graph A in FIG. 4 except for the fact that the horizontal scale is expanded. In this respect the Graph F includes a differential curve which is applied to the apparatus 326 during a first mode of operation thereof as indicated by roman numeral I and an integral curve 350 which is applied to the apparatus 326 during a second mode of operation thereof indicated by the roman numeral II. The apparatus 326 has a third mode of operation during which the maximum amplitude of the integral curve 350 is applied to the apparatus 326 as indicated at 352 in Graph F. The third mode of operation indicated by the roman numeral III has a longer duration than the first two modes as clearly shown in FIG. 7. Before describing the operation of the digital gain control apparatus 326, it is to be noted that the Graph G represents the output signal at the output 78 of the amplifier 74 during the several modes of operation of the apparatus 326. Graph H represents the correction signal appearing at the output 116 of the comparator 108. Graph I represents the strobe signal applied via lead 347 to the input 344 of the gate 340. Graph J represents the output signal from the gate 340 which is applied to the input 338 of the up/down counter 332. And Graph K represents clock signal applied via lead 345 to the clock input 342 of the gate 340.

During the first mode of operation, the differential curve 348 is amplified by the amplifier 74 such that an amplified differential curve as shown at 360 in Graph G appears at the output 78 of the amplifier 74. Since the maximum amplitude of the differential signal 360 is less than the reference voltage applied to the comparator 108 there is no difference signal at the output 116 of the comparator 108 as indicated at 362 in Graph H. At the same time the control circuit (not shown) has changed the strobe signal from a logic one to a logic zero where it is maintained at logic zero during the first and second mode of operation of the apparatus 326 as shown at 364 in Graph I. With the strobe signal at logic zero, the output signal from the gate 340 is also at zero as indicated at 366 in Graph J. All the while the clock signal in the form of timed pulses is being applied to the gate 340 as indicated by Graph K.

At the end of the first mode of operation, the integral signal 350 is amplified by the amplifier 74 as shown at 368 in Graph G. When the amplitude of the integral 368 reaches the reference voltage shown at $e_r$ in Graph G, a difference or command signal appears at the output 116 of the comparator 108. This signal is shown at 370 in Graph H. However, at this time, the strobe signal is still at logic zero and although the difference signal 370 is applied to the input 336 of the up/down counter 332 nothing happens. Then at the end of the second mode of operation, the strobe signal goes from logic zero to logic one as indicated at 372. When this occurs, the gate 330 passes the clock signal shown on Graph K to the input 338 of the counter 332 as shown at 374 in Graph J. When one of the pulses of the clock signal is received by the counter 332 at the same time a command signal 370 is also applied to the counter 332, an output signal is applied by the counter 348 to actuate one or more of the electronic switches in the attenuator 334 to further attenuate the signal on line 24 applied to the attenuator 334. This will be a step change in attenuation as shown at 376 in Graph G. If the command signal 370 is still applied to the counter 332 when a subsequent clock pulse is applied to the counter 332, a further correct signal is applied by the counter 332 via the lead 348 to the attenuator to cause another step change in attenuation as indicated at 378 in Graph G. Again, if the signal 370 is still being applied to the up/down counter 332 when a third clock pulse is applied to the counter 332, another step change in attenuation will occur as shown at 380 in Graph G. This step change lowers the output signal at the output 78 of the amplifier 74 to a level below the reference voltage $e_r$. As a result the command signal 370 will be terminated as shown at 382 in Graph H.

It will be noted that the comparator 108 only produces an output signal when the output voltage from the amplifier 74 applied to the input 110 of the comparator 108 is greater than the reference voltage applied to the input 112 of the comparator 108. Thus, although the voltage level indicated at 380 is less than the reference voltage, no correct signal appears at the output 116. Stated otherwise, the signal now at the output 116 and applied to the input 336 of the counter 332 is a logic zero signal.

The up/down counter 332 operates to increase or decrease attenuation dependent upon the logic signals appearing at the input 336 and 338. Thus, when there is a logic zero at both inputs the counter 332 does not change the setting of the ladder attenuator 334. Also when there is a logic zero on the input 338 and a logic one on the input 336, no change occurs. However, when there is a logic one on both inputs, the counter 332 increases the attenuation and when there is a logic zero on the input 336, such as occurs at 382, in Graph H and a logic one signal such as the pulse 384 in Graph J is applied to the input 338 the attenuation is decreased. This decreased attenuation results in an increase in the output signal from the amplifier 74 as indicated at 386 in Graph G. This output level 386 is above the reference voltage $e_r$ and will cause a difference signal to be generated by the comparator 108 as indicated at 388 in Graph H. As a result unless the voltage level 378 is equal to the reference voltage, the system will "hunt." That is to say, the output of the amplifier 74 will go up and down as shown in Graph G between the level 378 and the level 380. At the same time, the output signal 116 will go up and down between the zero level 382 and the signal correct level 388 as shown in Graph H until the third mode of operation of the apparatus 326 is completed. Then the modes of operation are repeated in the same manner as with the gain control apparatus 26 and 226.

Although the analog gain control apparatus 26 shown in FIG. 3 is preferred for most applications, the digital gain control apparatus 326 is preferred when it is desired to use a digital control system.

Although the gain control apparatus of the present invention has been particularly described with reference to its use in a particle size analyzing apparatus, it is to be understood that the teachings of the invention can be utilized in other data or information analyzing systems where pulse heights of variable data are analyzed.

Also it is to be understood that obvious modifications and variations can be made to the electrical circuits of the invention disclosed herein without departing from the spirit or scope of the invention. Accordingly, the scope of the invention is only to be limited as necessitated by the accompanying claims.

What it is desired to claim by Letters Patent of the United States is:

1. In a method for presenting a visual display of particle size distribution and the integral thereof including the steps of passing a given amount of sample containing a plurality of particles through a sensing zone, generating a particle pulse for each particle sensed, each particle pulse having an amplitude related to the size of the particle sensed, segregating the particle pulses into a predetermined number of pulse amplitude ranges, generating in each range an output pulse for each particle pulse having an amplitude falling in that range, separately accumulating the output pulses in each range to obtain a plurality of signal levels each being indicative of the number or quantity of particles in a given size range, cyclically applying the signal levels in a timed sequence to a visual display device to present thereon a particle size distribution curve, and cyclically, sequentially and in cumulative timed steps applying the signal levels to the visual display device to present thereon an integral curve of the particle size distribution curve, the last two steps being repeatedly performed while output pulses are being accumulated, the improvement comprising the steps of cyclically and automatically adjusting the maximum amplitude of the integral curve with respect to a reference voltage related to the maximum voltage to be displayed on the visual display device for a given setting thereof.

2. The method as claimed in claim 1 wherein said step of adjusting the maximum amplitude of the integral curve includes the steps of comparing the maximum amplitude of the integral of the signal levels with the reference voltage, producing a difference signal equal to the difference between said maximum amplitude and said reference voltage and feeding the difference signal to an attenuating circuit to produce a signal which is applied to the visual display device and which has a maximum amplitude substantially equal to said reference voltage when all of the signal levels are being applied to said attenuating circuit.

3. The method as claimed in claim 2 wherein said difference signal is used to alter the resistance of a voltage variable resistor in the attenuating circuit.

4. In a particle size analyzing apparatus including a particle sensor which produces a particle pulse upon sensing a particle in a given amount of sample when the particle is in a sensing zone, the amplitude of each particle pulse being related to the size of the particle sensed, a plurality of particle pulse amplitude discriminators for sensing particle pulses within predetermined pulse amplitude ranges related to given particle size ranges and for producing an output pulse having a predetermined amplitude for each particle pulse sensed within one of said amplitude ranges, means for separately accumulating the output pulses from each discriminator, an output channel connected to each accumulator, a visual display device, and an electronic switching device for sequentially, alternately and cyclically connecting each of said output channels to said visual display device for presenting on the device the accumulator output signal levels appearing on said channels in spaced relationship thereby tracing on said visual display device a particle size distribution curve for the given amount of sample, said switching device also being operable to connect said output channels sequentially, cyclically and in timed steps to the visual display device to trace thereon an integral curve of the particle size distribution curve, the improvement comprising a gain control apparatus connected between said switching device and said visual display device and including a source of reference voltage related to the maximum voltage to be displayed on the visual display device for a given setting thereof, an attenuating circuit, and means for comparing the reference voltage with an integral signal equal to the sum of the signal levels on all of the output channels, for producing a difference signal equal to the difference between this sum and said reference voltage, and for feeding said difference signals to said attenuating circuit for causing said attenuating circuit to attenuate said integral signal to a signal having a maximum amplitude substantially equal to said reference voltage.

5. In an apparatus for analyzing particles, the improvement comprising, a system for displaying particle size distribution on a 100 percent scale on a visual display device irrespective of the quantity of particles analyzed, the number of particles in different size ranges, so far analyzed at any point in time, being represented by signal levels in diverse signal channels in the particle analyzing apparatus, the signal level in each channel at any time being related to the amount of particles of one size analyzed up to that point in time, the visual display being a comparison of the signal levels representing the number of particles in each size range and such visual display can take the form of a particle size distribution curve or an integral curve thereof, said system including a source of reference voltage related to the maximum voltage to be displayed on the visual display device for a given setting thereof, an amplifier having an output connected to the visual display device, means for selectively connecting the signal channels to an input of said amplifier, means connected between the output of said amplifier and a circuit junction of said amplifier for comparing the reference voltage with the output of said amplifier when all of the signal channels are connected to the input of said amplifier, for producing a difference signal equal to the difference between that output of the amplifier and said reference voltage and means for utilizing said difference signal to attenuate the input to said amplifier whereby said amplifier produces an output signal having a maximum amplitude substantially equal to said reference voltage when all of the signal channels are connected to the input of the amplifier.

6. In a particle analyzing apparatus including means for generating a signal for each particle sensed in a sensing zone, each signal being related to the size of the particle sensed, means for accumulating signals for particles falling in different size ranges and a visual display device for displaying signal levels in the various accumulating means, the improvement comprising a system for adjusting the signal level received from each accumulating means before the signal level is displayed on the visual display device, said system being connected between the accumulating means and the visual display device and including means for cyclically and automatically adjusting the amplitude of the sum of the signal levels with respect to a reference voltage related to the maximum voltage to be displayed on the visual display device for a given setting thereof whereby for the sum of the signal levels said system cyclically produces an output signal having a maximum amplitude substantially equal to the reference voltage during the analyzing of a fluid sample containing particles and for any aliquot thereof.

7. The system as claimed in claim 6 wherein said means for adjusting the amplitude of the signal level includes a source of reference voltage related to the maximum voltage to be displayed on the visual display device for a given setting thereof, means for comparing the reference voltage with the amplitude of a signal in said system related to the sum of the signal levels and for producing a difference signal equal to the difference between the system signal and said reference voltage and means for utilizing said difference signal to attenuate the system signal whereby said system produces for the sum of the signal levels an output signal having a maximum amplitude substantially equal to said reference voltage.

8. The system as claimed in claim 7 wherein said comparing means includes a comparator having one input connected to the output of said system, one input connected to said source of reference voltage and an output where said difference signal appears.

9. The system as claimed in claim 8 wherein said means for utilizing said difference signal includes an attenuation circuit comprising a voltage variable resistor and said comparing means is connected to said voltage variable resistor.

10. The system as claimed in claim 9 wherein said voltage variable resistor is a field-effect transistor having its gate connected to the output of said comparing means.

11. The system as claimed in claim 7 including an electronically controlled switch having a first terminal connected to the output of said comparing means and a second terminal connected to said means for utilizing said difference signal to attenuate the input signal levels received from the accumulating means said switch being operated by an electronic timer which closes said switch at the same time the timer simultaneously connects all of the signal levels in the accumulating means to said system whereby said system is only operated to adjust the output of said system when a maximum input signal is applied to said system.

12. The system as claimed in claim 11 wherein said means for utilizing said difference signal includes an attenuation circuit including a voltage variable resistor and said second terminal of said switch is connected to a gate of said voltage variable resistor.

13. The system as claimed in claim 11 wherein said comparing means includes a memory device, connected to said second terminal of said switch, for storing said difference signal and for applying the same to said means for utilizing said difference signal during the time said switch is open and until a new difference signal is produced upon a subsequent closing of said switch.

14. The system as claimed in claim 13 wherein said memory device is a capacitor.

15. The system as claimed in claim 7 including an input resistor connected to the output of the accumulating means.

16. The system as claimed in claim 7 including an amplifier connected between the accumulating means and the visual display device.

17. The system as claimed in claim 9 including an amplifier connected between the accumulating means and the visual display device, said attenuation circuit being connected to an input of said amplifier.

18. The system as claimed in claim 9 including a zero offset circuit connected between the output of said system and said voltage variable resistor.

19. The system as claimed in claim 10 including a zero offset circuit connected between the output of said system and the source terminal of said field-effect transistor.

20. The system as claimed in claim 16 wherein said means for utilizing said difference signal includes a gain control circuit for said amplifier, said gain control circuit including two resistors connected in series between the output of said amplifier and the common potential for said system, one of said resistors being a voltage variable resistor and said comparing means being connected to said voltage variable resistor.

21. The system as claimed in claim 20 including a zero offset circuit connected from the output of said system to both an input of said amplifier and the junction between said two resistors.

22. The system as claimed in claim 7 including a ladder attenuator connected between the accumulating means and the visual display device, an up/down counter having an output connected to said ladder attenuator and having two logic inputs for controlling the up attenuation signal or the down attenuation signal applied by said counter to said attenuator, said comparing means being connected to one input of said counter for applying said difference signal thereto, and gate means for applying clock pulses for predetermined times to the second input of said counter whereby the input to said system can be digitally attenuated in steps when a difference signal is applied to said one input.

23. The system as claimed in claim 22 including an amplifier connected between said ladder attenuator and said visual display device, said comparing means being connected between the output of said amplifier and said up/down counter.

* * * * *